United States Patent
Matsunaga et al.

(10) Patent No.: US 9,011,007 B2
(45) Date of Patent: Apr. 21, 2015

(54) SPINDLE UNIT

(71) Applicant: JTEKT Corporation, Osaka-shi (JP)

(72) Inventors: Shigeru Matsunaga, Anjo (JP); Toshiyuki Okita, Nishio (JP); Ryota Tanase, Ogaki (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 13/914,770

(22) Filed: Jun. 11, 2013

(65) Prior Publication Data

US 2013/0336603 A1  Dec. 19, 2013

(30) Foreign Application Priority Data

Jun. 19, 2012  (JP) ................. 2012-137526

(51) Int. Cl.
| | |
|---|---|
| F16C 32/06 | (2006.01) |
| F16C 27/04 | (2006.01) |
| B23Q 1/38 | (2006.01) |
| B23Q 1/70 | (2006.01) |
| B23Q 11/00 | (2006.01) |
| F16C 21/00 | (2006.01) |

(52) U.S. Cl.
CPC .............. *F16C 27/045* (2013.01); *B23Q 1/38* (2013.01); *B23Q 1/70* (2013.01); *B23Q 11/0032* (2013.01); *F16C 32/06* (2013.01); *B23Q 2220/006* (2013.01); *F16C 21/00* (2013.01)

(58) Field of Classification Search
USPC ............. 384/99, 101, 117, 234, 504, 512; 409/225, 232, 230, 234, 274, 904
See application file for complete search history.

(56) References Cited

U.S. PATENT DOCUMENTS

| | | | | |
|---|---|---|---|---|
| 3,242,791 | A * | 3/1966 | Smith ........................... | 188/379 |
| 4,180,946 | A * | 1/1980 | Heijkenskjold et al. ........ | 451/24 |
| 5,322,304 | A * | 6/1994 | Rivin ............................ | 279/103 |
| 5,349,537 | A * | 9/1994 | Burger et al. ................. | 700/280 |
| 5,595,391 | A * | 1/1997 | Rivin ............................ | 279/103 |
| 5,921,731 | A * | 7/1999 | Chandrasekar ............... | 409/231 |
| 6,537,000 | B1 * | 3/2003 | Weck ............................ | 409/141 |
| 6,779,955 | B2 * | 8/2004 | Rivin ............................ | 409/234 |
| 6,806,606 | B2 * | 10/2004 | Ohtachi et al. ............... | 310/90.5 |
| 6,808,345 | B2 * | 10/2004 | Kato ............................. | 409/144 |
| 7,225,884 | B2 * | 6/2007 | Aeberhard .................... | 173/216 |
| 7,367,762 | B2 * | 5/2008 | Takase et al. ................ | 409/233 |
| 7,625,121 | B2 * | 12/2009 | Pettinato et al. ............... | 384/99 |
| 7,812,493 | B2 * | 10/2010 | Kubo et al. ................... | 310/90.5 |

(Continued)

FOREIGN PATENT DOCUMENTS

| | | |
|---|---|---|
| EP | 2 308 635 A1 | 4/2011 |
| FR | 2 650 352 A1 | 2/1991 |

(Continued)

OTHER PUBLICATIONS

Extended European Search Report issued Aug. 8, 2013 in Patent Application No. 13171604.5

*Primary Examiner* — Marcus Charles
(74) *Attorney, Agent, or Firm* — Oblon, McClelland, Maier & Neustadt, L.L.P.

(57) ABSTRACT

A spindle unit includes: a main spindle that holds a rotary tool, and that is rotated; bearings by which the main spindle is rotatably supported; and a damper bearing by which the main spindle is rotatably supported, and that has a damping coefficient larger than damping coefficients of the bearings. The damping coefficient of the damper bearing is set to a value within a range from 10,000 to 1,000,000 N·s/m.

10 Claims, 4 Drawing Sheets

(56) References Cited

U.S. PATENT DOCUMENTS

| | | |
|---|---|---|
| 8,459,908 B2 * | 6/2013 | Cook .......................... 409/234 |
| 2003/0147712 A1 * | 8/2003 | Kai et al. ...................... 409/141 |
| 2003/0170087 A1 * | 9/2003 | Sugata et al. ................ 409/136 |
| 2005/0220556 A1 * | 10/2005 | Takase et al. ................ 409/233 |
| 2008/0231129 A1 | 9/2008 | Kubo et al. |
| 2009/0116924 A1 * | 5/2009 | Shinano ........................ 409/232 |
| 2009/0146530 A1 * | 6/2009 | Tang et al. ............... 310/323.18 |
| 2011/0081216 A1 | 4/2011 | Ogura et al. |
| 2012/0082408 A1 * | 4/2012 | Moriguchi et al. ........... 384/517 |

FOREIGN PATENT DOCUMENTS

| | | |
|---|---|---|
| JP | 6-8005 | 1/1994 |
| JP | 2004-106091 | 4/2004 |
| JP | 2004-150563 A | 5/2004 |
| WO | WO 2011052421 A1 * | 5/2011 |

* cited by examiner

SPINDLE UNIT

INCORPORATION BY REFERENCE/RELATED APPLICATION

This application claims priority to Japanese Patent Application No. 2012-137526 filed on Jun. 19, 2012 the disclosure of which, including the specification, drawings and abstract, is incorporated herein by reference in its entirety.

BACKGROUND OF THE INVENTION

1. Field of the Invention

The invention relates to a spindle unit used in a machine tool.

2. Discussion of Background

For example, Japanese Patent Application Publication No. 6-8005 describes a spindle unit in which an intermediate housing is interposed between a front bearing arranged at the front side (tool side) of a main spindle and a front housing, and the intermediate housing is held by a hydrostatic bearing with a damping property, so that chatter vibration of the main spindle during machining is suppressed. Japanese Patent Application Publication No. 2004-106091 describes a spindle unit in which a hydrostatic air bearing is provided next to a ball bearing arranged at the front side (tool side) of a main spindle, so that chatter vibration of the main spindle during machining is suppressed. US 2008/0231129 A1 describes a spindle unit in which a plurality of radial magnetic bearings and a plurality of radial displacement sensors are arranged at the front side (tool side) of a main spindle, and electromagnets of the radial magnetic bearings are controlled on the basis of the radial displacements detected by the radial displacement sensors, so that resonance of the main spindle is suppressed.

However, the conventional arts have a problem that the damping force is weak, and therefore chatter vibration of the main spindle is not suppressed sufficiently.

SUMMARY OF THE INVENTION

The invention provides a spindle unit capable of suppressing chatter vibration more reliably.

According to a feature of an example of the invention, there is provided a spindle unit, including: a main spindle that holds a rotary tool, and that is rotated; a bearing by which the main spindle is rotatably supported; and a damper bearing by which the main spindle is rotatably supported, and that has a damping coefficient larger than a damping coefficient of the bearing, wherein the damping coefficient of the damper bearing is set to a value within a range from 10,000 to 1,000,000 N·s/m.

According to another feature of an example of the invention, the damper bearing has a damping coefficient within a range from 30,000 to 700,000 N·s/m.

According to a further feature of an example of the invention, the damper bearing has a damping coefficient within a range from 30,000 to 100,000 N·s/m.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENT

Hereinafter, embodiments of the invention will be described with reference the accompanying drawings.

Figure 1:
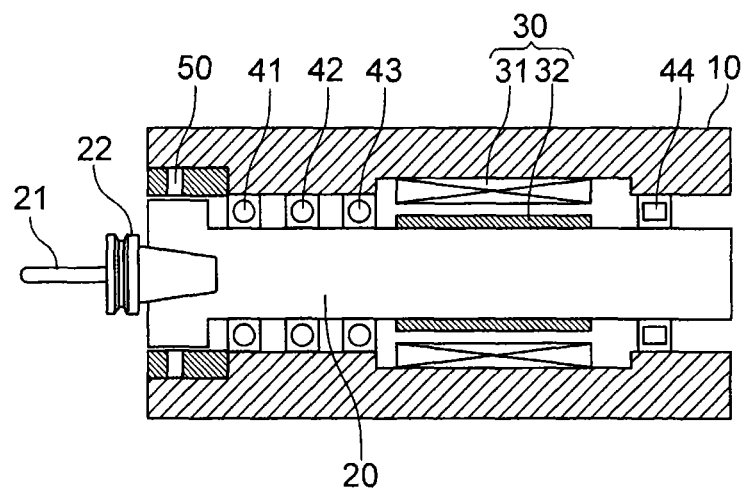
FIG. 1 is a sectional view illustrating a spindle unit according to an embodiment of the invention, taken along the axial direction of the spindle unit.

The configuration of a spindle unit will be described with reference to FIG. 1. As shown in FIG. 1, the spindle unit includes a housing 10, a main spindle 20, a motor 30, a plurality of bearings 41 to 44, any one of which is a first bearing, and a damper bearing 50.

The housing 10 is formed in a hollow tubular shape, and the main spindle 20 is passed through the housing 10. The main spindle 20 holds a rotary tool 21 held by a holder 22, at its distal end side (the left side in FIG. 1). The motor 30 is disposed inside the housing 10, and includes a stator 31 secured to the housing 10 and a rotor 32 secured to the main spindle 20.

The bearings 41 to 44 support the main spindle 20 such that the main spindle 20 is rotatable with respect to the housing 10. The bearings 41 to 43 are, for example, ball bearings, and are located at positions closer to the rotary tool 21 than the motor 30 (located at the front side of the main spindle 20). On the other hand, the bearing 44 is, for example, a roller bearing, and is located on the opposite side of the motor 30 from the rotary tool 21 (located at the rear side of the main spindle 20). That is, the bearings 41 to 44 are arranged such that the motor 30 is interposed between the bearings 41 to 43 and the bearing 44 in the axial direction.

The damper bearing 50 is, for example, a hydrostatic fluid bearing utilizing oil or the like, and is located at a position closer to the rotary tool 21 than the bearing 41, which is located closest to the rotary tool 21 among the bearings 41 to 43. That is, the damper bearing 50 is located closest to the rotary tool 21 among all the bearings 41 to 44 and 50. Further, the damper bearing 50 has a damping coefficient greater than the damping coefficients of the bearings 41 to 44. The damping coefficients will be described later in detail. A hydrostatic oil bearing, a hydrostatic air bearing or a magnetic bearing may be selectively used as the damper bearing 50, depending upon a damping coefficient C applied to the damper bearing 50.

Figure 2:
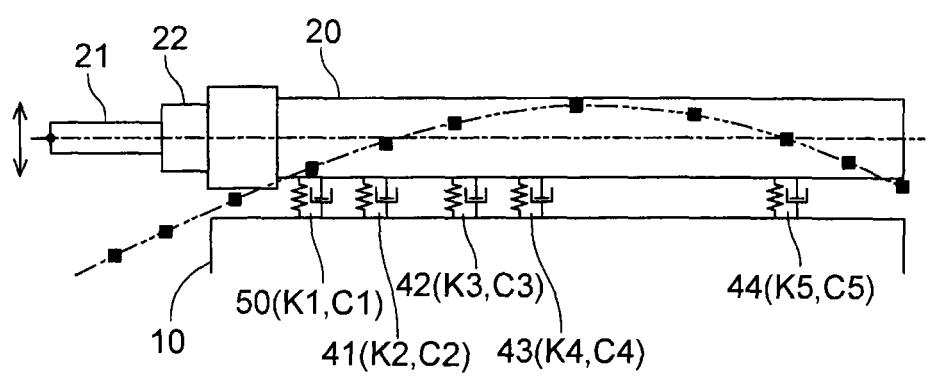
FIG. 2 is a view illustrating an analysis model of the spindle unit shown in FIG. 1.

Next, with reference to FIG. 2, an analysis model of the spindle unit will be described. As shown in FIG. 2, each bearing has a spring constant K and a damping coefficient C. Note that the spring constants and the damping coefficients of the damper bearing 50 and the bearings 41 to 44 will be denoted by K1 to K5 and C1 to C5, respectively.

In a state where the damper bearing 50 and the bearings 41 to 44 having the spring constants K1 to K5 and the damping coefficients C1 to C5, respectively, are arranged, a force is exerted on the distal end of the rotary tool 21 in the radial direction of the main spindle 20. As a result, the main spindle 20 is deformed as indicated by a two-dot chain line. An amount of displacement of the distal end of the rotary tool 21 at this time is calculated.

Figure 3A:
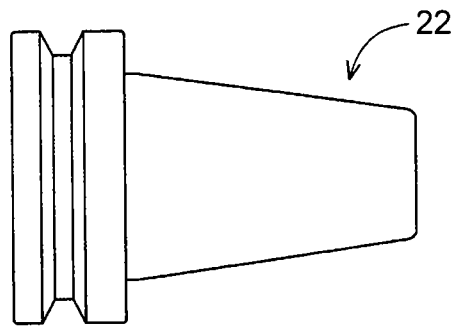
FIG. 3A is a view illustrating a rotary tool holder of a BT type, which constitutes the spindle unit shown in FIG. 1.
Figure 3B:
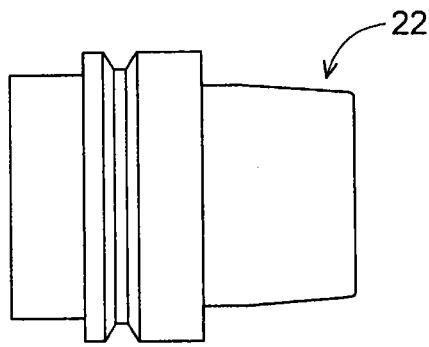
FIG. 3B is a view illustrating a rotary tool holder of a HSK type, which constitutes the spindle unit shown in FIG. 1.

Note that the distal end side of the main spindle 20 has a configuration corresponding to the shape of the holder 22. When the holder 22 is a holder of a BT type as shown in FIG. 3A, the holder 22 may be selected from MAS BT-30 to BT-50. When the holder 22 is a holder of a HSK type as shown in FIG. 3B, the holder 22 may be selected from HSK-40 to HSK-100. That is, the analysis model indicates dimensions of the main spindle 20 to which the above-described holder can be applied. Note that MAS indicates standards for tools defined in Japanese Machine Tool builder's Association Standard, and HSK indicates standards for tools defined in ISO.

Figure 4:
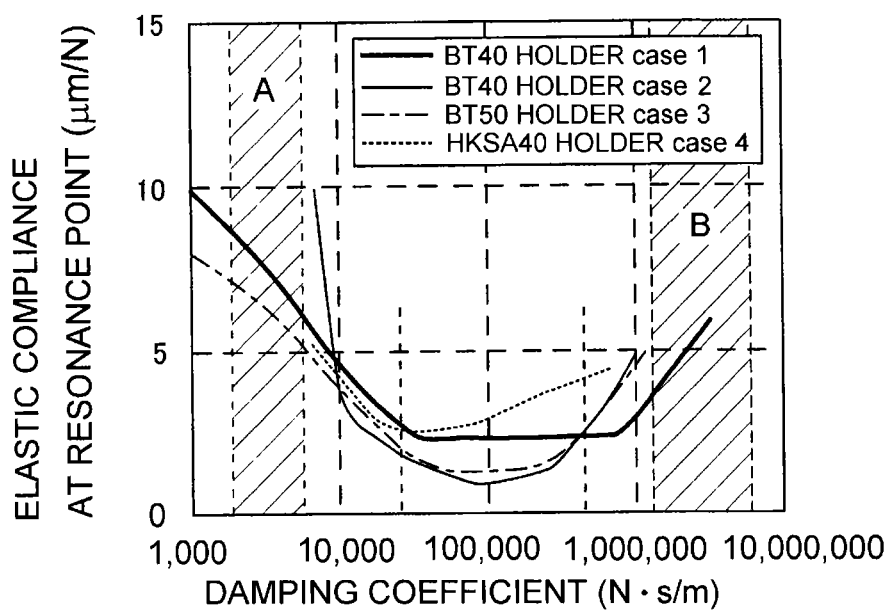
FIG. 4 is a graph showing variations of maximum values of elastic compliances at resonance points in a case where a damping coefficient C1 of the analysis model shown in FIG. 2 is changed.

The result of the analysis will be described with reference to FIG. 4. FIG. 4 shows the result of the analysis regarding four cases, that is, case 1 in which BT-40 is applied to the holder 22, case 2 in which BT-40 is applied to the holder 22, case 3 in which BT-50 is applied to the holder 22, and case 4 in which HSKA-40 is applied to the holder 22. A tool used in case 1 and a tool used in case 2 differ in diameter and length. Further, a tool used in case 3 has a diameter that is different from the diameter of the tool used in case 1. In the analysis model, only the damping coefficient C1 of the damper bearing 50 is changed as appropriate while the other damping coefficients C2 to C5 are maintained at 7,000 N·s/m. Further, the spring constants K1 to K5 are set to the same value.

A region A shown in FIG. 4 shows a damping coefficient range in a case where the main spindle 20 is supported only by bearings 41 to 44, that is, a range from approximately 2,000 to 7,000 N·s/m. That is, the other damping coefficients C2 to C5 are set to values which correspond to damping coefficients of bearings. Further, a region B shown in FIG. 4 shows a damping coefficient range in a case where the main spindle 20 is supported only by a hydrostatic oil bearing 50, that is, a range from approximately 1,150,000 to 7,000,000 N·s/m.

As shown in FIG. 4, because the main spindle 20 is supported by both the damper bearing 50 and the bearings 41 to 44, the damping coefficients are set to values between the values in the case where only the bearings are used (region A), and the values in the case where only the hydrostatic oil bearing is used (region B). In particular, by setting the damping coefficient C1 of the damper bearing 50 to a value within a range from 10,000 to 1,000,000 N·s/m, the maximum value of elastic compliance at each resonance point is set to a value around a local minimal value.

Note that the larger the maximum value of elastic compliance at a resonance point is, the more likely it is that chatter vibration occurs near the resonance point. Thus, the damping coefficient C1 is set as described above to make the maximum value of elastic compliance at a resonance point smaller, and therefore, it is possible to suppress occurrence of chatter vibration. In particular, by setting the damping coefficient C1 of the damper bearing 50 to a value within a range from 30,000 to 700,000 N·s/m, the maximum value of elastic compliance at a resonance point is brought within a range around a local minimum value in all the above-described cases.

Figure 5A:
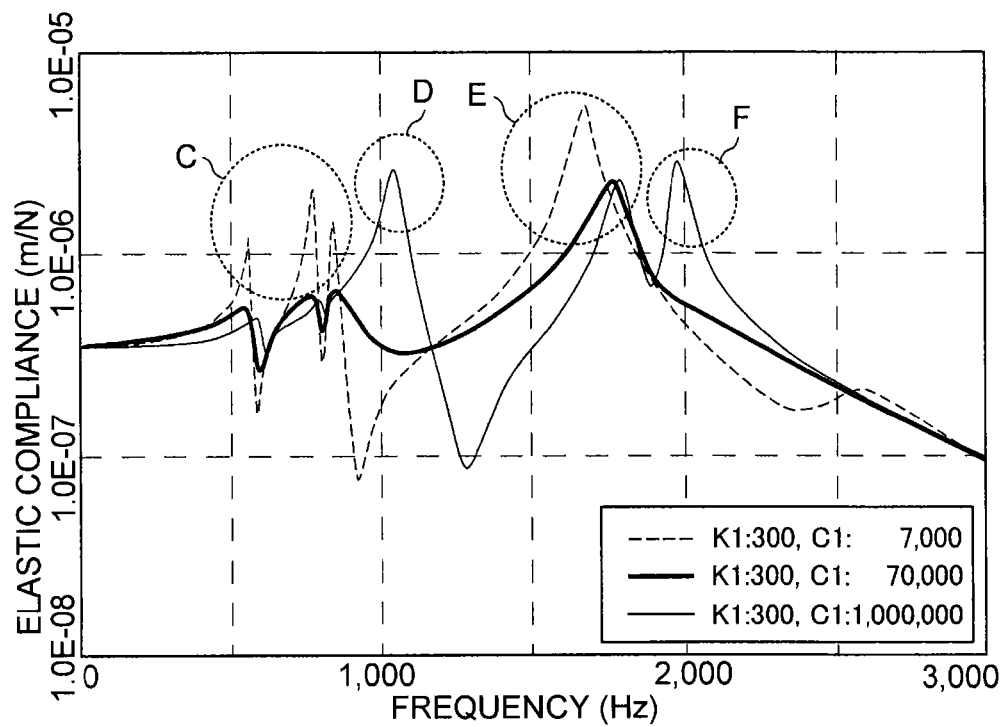
FIG. 5A is a graph showing frequency characteristics of the analysis model shown in FIG. 2, in which the ordinate axis represents the elastic compliance, that is, the amount of displacement of a distal end of the rotary tool with respect to an applied force, FIG. 5A showing the frequency characteristics for three damping coefficients C1 of 7,000, 70,000 and 1,000,000.
Figure 5B:
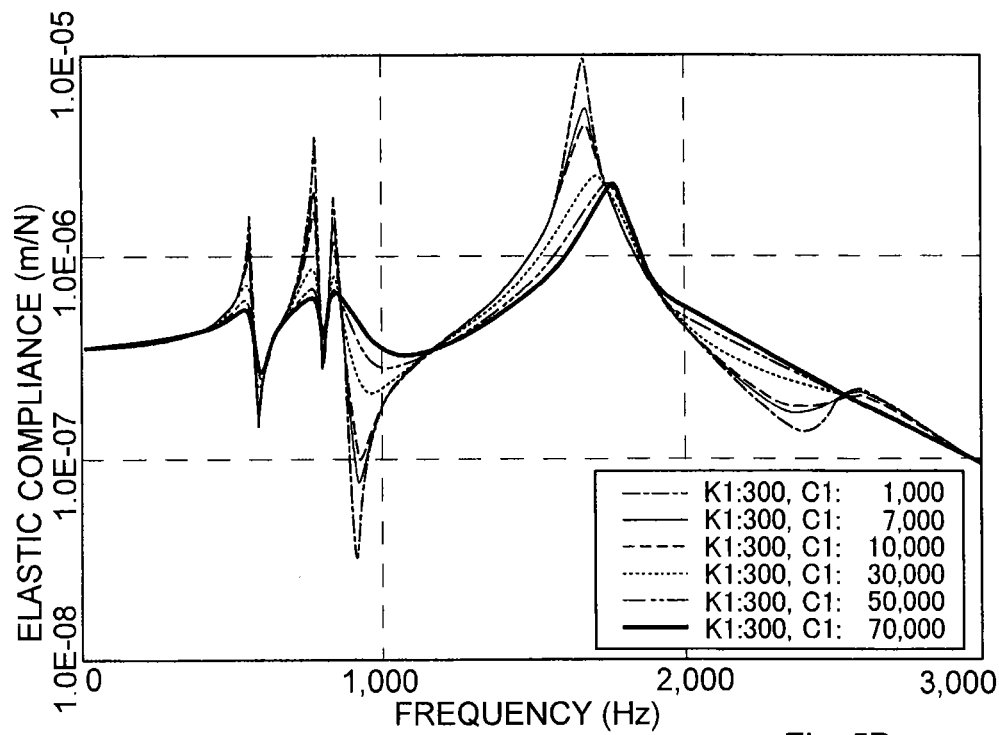
FIG. 5B is a graph in which frequency characteristics of the analysis model are shown, as in FIG. 5A, FIG. 5B showing the frequency characteristics for six damping coefficients C1 from 1,000 to 70,000.
Figure 5C:
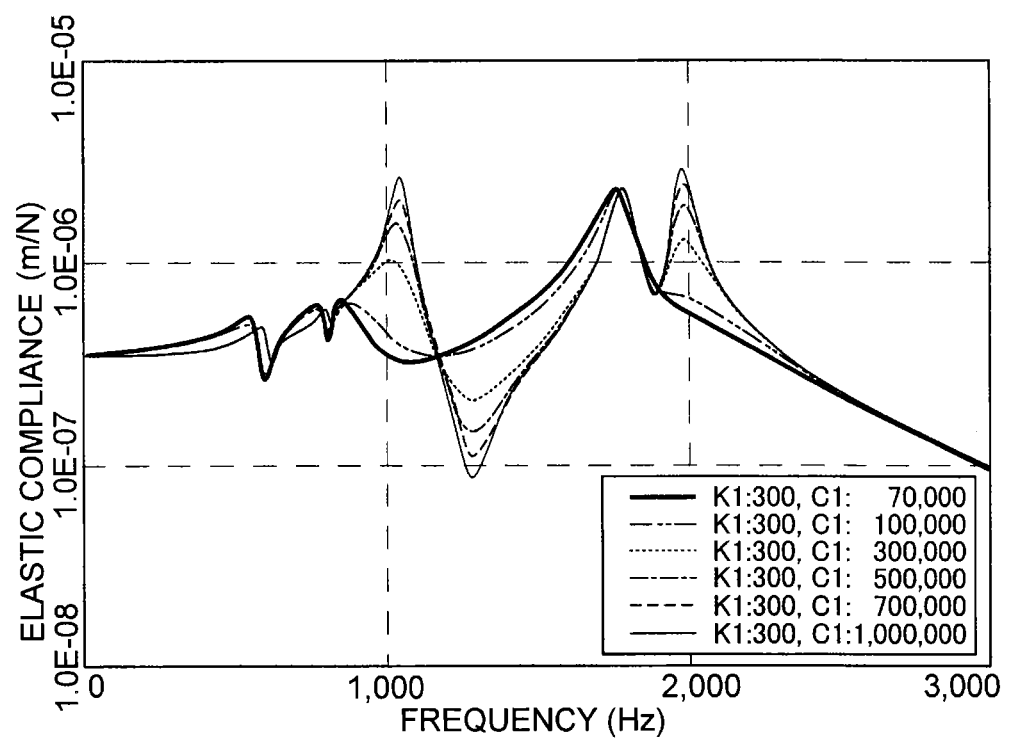
FIG. 5C is a graph in which frequency characteristics of the analysis model are shown, as in FIG. 5A, FIG. 5C showing the frequency characteristics for six damping coefficients C1 from 70,000 to 1,000,000.

Next, description will be provided with reference to FIG. 5A to FIG. 5C that are graphs showing results of the analysis, in which the abscissa axis represents the frequency and the ordinate axis represents the elastic compliance. The analysis was carried out in case 1 in which BT-40 is applied to the holder 22, and the damping coefficient C1 was changed among 1,000, 7,000, 10,000, 30,000, 50,000, 70,000, 100,000, 300,000, 500,000, 700,000 and 1,000,000 N·s/m.

For the sake of enhancing the readability, FIG. 5A shows only three cases where the damping coefficient C1 is set to 7,000, 70,000 and 1,000,000 N·s/m, respectively. Referring to FIG. 5A, in the case where the damping coefficient C1 is set to 7,000 N·s/m, that is, in the case where the damping coefficient of the damper bearing 50 is set to the same value as that of the bearings 41 to 44, the elastic compliance varies as follows. A primary resonance point, a secondary resonance point and a tertiary resonance point (region C in FIG. 5A) are present in a frequency band below 1,500 Hz. These resonance points are referred to as "low-order resonance points" (corresponding to "virtual low-order resonance point" according to the invention). The elastic compliance at each of the low-order resonance points is approximately 1.0E-06 m/N. The resonance point that exhibits the largest elastic compliance on the whole (region E in FIG. 5A) is present in a range equal to and above 1,500 Hz. This resonance point is referred to as "high-order resonance point" (corresponding to "virtual high-order resonance point" according to the invention). Note that, the resonance point that exhibits the largest elastic compliance (region E) is present in a range equal to and above 1,500 Hz and below 2,000 Hz in FIG. 5A, but this resonance point may be present in a range equal to and above 2,000 Hz depending upon the conditions or specifications of a tool.

In order to suppress occurrence of chatter vibration, it is effective to make the maximum value of the elastic compliance smaller. Further, by making the elastic compliances at a plurality of resonance points smaller, occurrence of chatter vibration is suppressed over a wider frequency band. Further, the smaller the number of resonance points is, the more effectively the occurrence of chatter vibration is suppressed.

Referring to FIG. 5A, in the case where the damping coefficient C1 is set to 1,000,000 N·s/m, the elastic compliance varies as follows. In the frequency band below 1,500 Hz, the elastic compliances at low-order resonance points (region C in FIG. 5A) are smaller than those in the case where the damping coefficient C1 is set to 7,000 N·s/m while a new resonance point is induced around 1,000 Hz (region D). On the other hand, in the frequency band equal to and above 1,500 Hz, the elastic compliance at a high-order resonance point (region E in FIG. 5A) becomes smaller than that in the case where the damping coefficient C1 is set to 7,000 N·s/m. However, a new resonance point is induced around 2,000 Hz (region F). On the whole, the maximum value of the elastic compliance in the case where the damping coefficient C1 is set to 1,000,000 N·s/m is smaller than that in the case where the damping coefficient C1 is set to 7,000 N·s/m, while new resonance points are induced around 1,000 Hz and around 2,000 Hz (regions D, F) in the case where the damping coefficient C1 is set to 1,000,000 N·s/m.

Referring to FIG. 5A, in the case where the damping coefficient C1 is set to 70,000 N·s/m, the elastic compliance varies as follows. In the frequency band below 1,500 Hz, the elastic compliances at low-order resonance points (region C in FIG. 5A) are smaller than those in the case where the damping coefficient C1 is set to 7,000 N·s/m. Further, no new resonance point as that in the region D is induced in the frequency band below 1,500 Hz. Further, in the frequency band equal to and above 1500 Hz, the elastic compliance at a high-order resonance point (region E in FIG. 5A) is smaller than that in the case where the damping coefficient C1 is set to 7,000 N·s/m. Further, no new resonance point as that in the region F is induced in the frequency band equal to and above 1,500 Hz.

Next, with reference to FIG. 5B, detailed examination will be made regarding the cases where the damping coefficient C1 is set to values within a range from 1,000 to 70,000 N·s/m. When the damping coefficient C1 is set to 1,000 N·s/m, the elastic compliances at low-order resonance points and a high-order resonance point are larger than those in the case where the damping coefficient C1 is set to 7,000 N·s/m.

On the other hand, as the damping coefficient C1 is increased from 7,000 N·s/m to 70,000 N·s/m, the elastic compliances at low-order resonance points and a high-order resonance point become smaller. Further, when the damping coefficient C1 is set to a value within a range from 7,000 to 70,000 N·s/m, no induced resonance point is present in the range below 1,500 Hz (region D in FIG. 5A) and also in the range equal to and above 1,500 Hz (region F in FIG. 5A).

Next, with reference to FIG. 5C, detailed examination will be made regarding the cases where the damping coefficient C1 is set to values within a range from 70,000 to 1,000,000 N·s/m. In the case where the damping coefficient C1 is set to values within the range from 7,000 to 1,000,000 N·s/m, the elastic compliances at low-order resonance points (region C in FIG. 5A) and a high-order resonance point (region E in FIG. 5A) do not change significantly.

In the case where the damping coefficient C1 is set to 100,000 N·s/m, the elastic compliances around 1,000 Hz and around 2,000 Hz are larger than those in the case where the damping coefficient C1 is set to 70,000 N·s/m. However, no resonance points are induced.

On the other hand, when the damping coefficient C1 is made larger than 100,000 N·s/m, a new induced resonance point (region D in FIG. 5A) other than the low-order resonance points is generated in the range below 1,500 Hz and a new induced resonance point (region F in FIG. 5A) other the high-order resonance point is generated in the range equal to and above 1,500 Hz. Further, as the damping coefficient C1 is increased further from 100,000 N·s/m, these elastic compliances become larger.

As understood from FIG. 5A to FIG. 5C, by setting the damping coefficient C1 to a value within the range from 10,000 to 1,000,000 N·s/m, the maximum value of the elastic compliance is made smaller. Further, in this range, the elastic compliances at the low-order resonance points (region C in FIG. 5A) and the high-order resonance point (region E in FIG. 5A) are made smaller.

Further, by setting the damping coefficient C1 to a value equal to or larger than 30,000 N·s/m, the elastic compliance at the high-order resonance point (region E in FIG. 5A) is made significantly small. That is, in the above-described range, the elastic compliance at the high-order resonance point is made substantially equal to that in the case where the damping coefficient C1 is set to 70,000 N·s/m, which is the optimum value.

Further, by setting the damping coefficient C1 to a value equal to or lower than 100,000 N·s/m, no new induced resonance points are generated in the range below 1,500 Hz (region D in FIG. 5A) and no new induced resonance point is generated in the range equal to and above 1,500 Hz (region F in FIG. 5A).

By arranging the damper bearing at a position closest to the rotary tool among all the bearings, the damper bearing is able to more effectively produce the damping effect, and, as a result, chatter vibration is more effectively suppressed.

By making an actual elastic compliance at a virtual low-order resonance point in the frequency band below 1,500 Hz, smaller than a virtual elastic compliance, it is possible to suppress occurrence of chatter vibration in this frequency band.

By preventing a new resonance point from being induced in the range above the frequency at the virtual low-order resonance point and below 1,500 Hz, occurrence of chatter vibration is suppressed as a whole while adverse effects due to application of damping is suppressed.

By preventing a new resonance point from being induced in the frequency band equal to and above 1,500 Hz, occurrence of chatter vibration is suppressed as a whole while adverse effects due to application of damping is suppressed.

In the case where any one of MAS BT30 to BT50 or any one of HSK 40 to HSK100 is applied to the rotary tool, chatter vibration is reliably suppressed.

By using a hydrostatic fluid bearing as the damper bearing, a high damping effect is obtained easily and reliably.

What is claimed is:

1. A spindle unit, comprising:
    a main spindle that holds a rotary tool, and that is rotated;
    a first bearing by which the main spindle is rotatably supported; and
    a damper bearing by which the main spindle is rotatably supported, and that has a damping coefficient larger than a damping coefficient of the first bearing;
    wherein the damping coefficient of the damper bearing is set to a value within a range from 10,000 to 1,000,000 N·s/m.

2. The spindle unit according to claim 1, wherein the damping coefficient of the damper bearing is set to a value within a range from 30,000 to 700,000 N·s/m.

3. The spindle unit according to claim 2, wherein the damping coefficient of the damper bearing is set to a value within a range from 30,000 to 100,000 N·s/m.

4. The spindle unit according to claim 1, wherein:
    the main spindle is supported by a plurality of bearings including the first bearing and the damper bearing; and
    the damper bearing is located closest to the rotary tool among all the bearings.

5. The spindle unit according to claim 1, wherein the damping coefficient of the damper bearing is set to a value such that an actual elastic compliance at a virtual low-order resonance point is smaller than the virtual elastic compliance,
    wherein when the damping coefficient of the damper bearing is virtually set to the same damping coefficient as the damping coefficient of the first bearing, a resonance point induced in a frequency band below 1,500 Hz is defined as the virtual low-order resonance point, and the elastic compliance at the virtual low-order resonance point is defined as a virtual elastic compliance.

6. The spindle unit according to claim 5, wherein the damping coefficient of the damper bearing is set to a value within such a range that a new resonance point other than the virtual low-order resonance point is not induced, in a frequency band which is above a frequency at the virtual low-order resonance point and below 1,500 Hz.

7. The spindle unit according to claim 1, wherein:
    the damping coefficient of the damper bearing is set to a value such that a new resonance point other than the virtual high-order resonance point is not induced, in a frequency band equal to and above 1,500 Hz, and wherein when the damping coefficient of the damper bearing is virtually set to the same damping coefficient as the damping coefficient of the first bearing, a resonance point induced in a frequency band equal to and above 1,500 Hz is defined as a virtual high-order resonance point.

8. The spindle unit according to claim 1, wherein the damper bearing is a hydrostatic fluid bearing.

9. The spindle unit according to claim 1, further comprising:
   second, third, and fourth bearings, and
   a motor,
   wherein the damper bearing is closer to a tool end of the rotary tool than any of the first, second, third, and fourth bearings or the motor.

10. The spindle unit according to claim 9, wherein the first, second, and third bearings are disposed adjacent each other on a first side of the motor, and the fourth bearing is disposed on a second side of the motor opposite the first side of the motor.

\* \* \* \* \*